United States Patent
Haider et al.

(10) Patent No.: US 9,289,746 B2
(45) Date of Patent: Mar. 22, 2016

(54) AMINE GRAFTED CHITOSAN NANOFIBER, METHOD FOR PREPARATION THEREOF AND ITS USE IN HEAVY METAL ADSORPTION

(71) Applicant: King Saud University, Riyadh (SA)

(72) Inventors: Sajjad Haider, Riyadh (SA); Yousef S. Al-Zaghayer, Riyadh (SA); Waheed Al-Masry, Riyadh (SA); Fekri Abdulraqeb Ahmed Ali, Riyadh (SA); Mohammed K. Hadj-Kali, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 14/186,033

(22) Filed: Feb. 21, 2014

(65) Prior Publication Data
US 2014/0309410 A1  Oct. 16, 2014

(30) Foreign Application Priority Data
Apr. 15, 2013  (EP) .................................... 13163660

(51) Int. Cl.
| | |
|---|---|
| C08B 37/08 | (2006.01) |
| B01J 20/24 | (2006.01) |
| C08L 5/08 | (2006.01) |
| B01J 20/26 | (2006.01) |
| B01J 20/28 | (2006.01) |
| B01J 20/32 | (2006.01) |
| C02F 1/28 | (2006.01) |
| C02F 101/20 | (2006.01) |
| C02F 101/22 | (2006.01) |

(52) U.S. Cl.
CPC ............... *B01J 20/24* (2013.01); *B01J 20/265* (2013.01); *B01J 20/28007* (2013.01); *B01J 20/3212* (2013.01); *B01J 20/3259* (2013.01); *C02F 1/288* (2013.01); *C08B 37/003* (2013.01); *C08L 5/08* (2013.01); *C02F 1/285* (2013.01); *C02F 1/286* (2013.01); *C02F 2101/20* (2013.01); *C02F 2101/22* (2013.01); *C02F 2305/08* (2013.01)

(58) Field of Classification Search
None
See application file for complete search history.

(56) References Cited

U.S. PATENT DOCUMENTS

| | | | |
|---|---|---|---|
| 2010/0216211 A1 | 8/2010 | Shauer et al. | |
| 2013/0210111 A1 | 8/2013 | Bluchel et al. | |

OTHER PUBLICATIONS

Ainrudhan et al., "Glutaraldehyde cross-linked epoxyaminated chitosan as an adsorbentfor the removal and recovery of copper(II) from aqueous media" Colloids and Surfaces A: Physiochem. Eng. Aspects (2009) vol. 351 pp. 52-59.*

Haider et al., "Preparation of the electrospun chitosan nanofibers and their applications to the adsorption of Cu(II) and Pb(II) ions from an aqueous solution"Journal of Membrane Science (2009) vo. 328 pp. 90-96.*

Haider et al., "Fabrication of Chitosan Nanofibers Membrane with Improved Stability and Britility" Advanced Science Letters (Oct. 2012) vol. 17 pp. 217-223.*

Kyzas G Z et al; "Copper and chromium (VI) removal by chitosan derivatives-Equilibrium and kinetic studies"; Chemical Engineering Journal, vol. 152, No. 2-3; Oct. 15, 2009: pp. 440-448.

European Search Report for corresponding Application No. EP 13163660.7 dated Aug. 16, 2013.

R. Barreiro-Iglesias et al.; "Preparation of chitosan beads by simultaneous cross-linking/insolubilisation in basic pH Rheological optimisation and drug loading/release behavior"; European Journal of Pharmaceutical Sciences 24 (2005) 77-84.

(Continued)

*Primary Examiner* — Eric Olson
(74) *Attorney, Agent, or Firm* — Renner, Otto, Boisselle & Sklar, LLP

(57) ABSTRACT

The present invention relates to an amine grafted chitosan nanofiber having the formula (I)

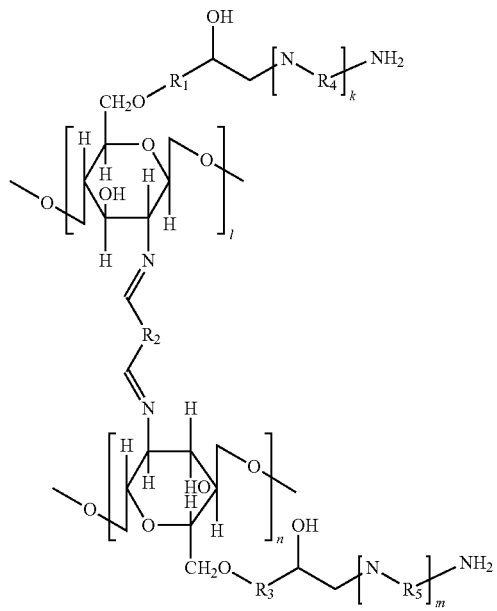

Formula (I)

wherein $R_1$ to $R_5$ are independently selected from linear or branched $C_1$-$C_{20}$ alkandiyl $C_6$-$C_{24}$ arenediyl; k and m are independently selected from 1 to 10, wherein, in case that k and/or m are >1, each $R_4$ and $R_5$ group can be independently selected; and l and n are independently selected from 50-3000, a method for the preparation thereof and its use in heavy metal adsorption.

6 Claims, 2 Drawing Sheets

(56) References Cited

OTHER PUBLICATIONS

Seong-In Park et al.; "Glutaraldehyde-crosslinked chitosan beads for sorptive separation of Au(III) and Pd(II): Opening a way to design reduction-coupled selectivity-tunable sorbents for separation of precious metals"; Journal of Hazardous Materials 248-249 (2013) 211-218.

W. S. Wan Ngah et al.; "Comparative Adsorption of Lead(II) on Flake and Bead-types of Chitosan"; Journal of the Chinese Chemical Society, 2002,49,625-628.

Tomasz Jóźiwiak et al.; "Effect of Cross-Linking With Glutaraldehyde on Adsorption Capacity of Chitosan Beads"; Progress on Chemistry and Application of Chitin and Its Derivatives; vol. XVIII, 2013, 35-48.

* cited by examiner

AMINE GRAFTED CHITOSAN NANOFIBER, METHOD FOR PREPARATION THEREOF AND ITS USE IN HEAVY METAL ADSORPTION

The present application is related to and claims priority under 35 U.S.C. §119(a) to pending European Application No. 13163660.7 filed 15 Apr. 2013, the entirety of which is hereby incorporated by reference.

TECHNICAL FIELD

The present invention relates to an amine grafted chitosan nanofiber, method for preparation thereof and its use in heavy metal adsorption.

BACKGROUND

Nanofibers technology has hugely impacted both science and engineering disciplines. The motivations for the miniaturization process of polymers recline in producing nanosized fibers with superior properties (i.e., high mechanical properties and large surface area per unit mass) compared to micro fiber and film. The polymers functionalities plus the unique characteristics of nanofibers originated from being engineered in various forms have allowed nanofibers to be used in advance applications such as filtration, multifunctional membranes, composite reinforcement, tissue engineering scaffolds, wound dressings, drug delivery, artificial organs and vascular grafts, etc. nanofibers membranes, produced from synthetic and biopolymers have received attention due to their ease of fabrication and the ability to control their compositional, structural and functional properties. The key advantage in producing fibers is stored in their extremely small diameters, large surface-to-volume ratio, high porosity and superior mechanical performance.

Today, there is growing interest in developing natural low-cost alternatives to synthetic polymers (Crini et al., Prog. Polym. Sci., 2008, 33, 399-447). Of late, the most bountiful natural biopolymers chitin and chitosan, gelatin, etc., have become cynosure of all party because of an unusual combination of biocompatibility, low toxicity, low immunogenicity, and mechanical and physical properties as compared to synthetic polymers. However, applications of chitin are limited due to its inherent insoluble and intractable nature, whereas gelatin is not stable in aqueous solution and needs to be stabilized first to be used in the aqueous solution. chitosan ((1→4)-2-amino-2-deoxy-d-glucan and some traces of (1→4)-2-acetamido-2-deoxy-d-glucan) an alkaline hydrolytic derivative of chitin has better solubility profile, less crystallinity and is amenable to chemical modifications due to presence of functional groups as hydroxyl, amine, and acetamido. The chemical modification of chitosan is of interest because the modification would not change the fundamental skeleton of chitosan, would keep the original physicochemical and biochemical properties and finally would bring new or improved properties. Several chemical modifications such as oligomerization, alkylation, acylation, quaternization, hydroxyalkylation, carboxyalkylation, thiolation, sulfation, phosphorylation, enzymatic modifications and graft copolymerization along with many assorted modifications have been carried out. The chemical modification affords a wide range of derivatives with modified properties for specific end user applications in diversified areas mainly of pharmaceutical, biomedical and biotechnological fields. Assorted modifications, including chitosan hybrids with sugars, cyclodextrin, dendrimers, and crown ethers, have also emerged as interesting multifunctional, macromolecules. The versatility in possible modifications and the applications of chitosan derivatives presents a great challenge to scientific community and to industry. The successful acceptance of this challenge will change the role of chitosan from being a molecule in waiting to a lead player. Chitosan has been investigated by several researchers as a biosorbent for the capturing of dissolved hazardous organic and inorganic materials from aqueous solutions (Wan et al., React. Funct. Polym. 2008, 68, 1013-1051; Justus et al., Polymer, 2004, 45, 6285-6290). Its use as a biosorbent is justified by two important advantages: firstly, its low cost compared to commercial activated carbon (chitosan is derived by deacetylation of the naturally occurring biopolymer chitin which is the second most abundant polysaccharide in the world after cellulose); secondly, its outstanding chelation behavior (one of the major applications of this amino-polymer is based on its ability to tightly bind pollutants, in particular heavy metal ions and colored dyes).

Increase in the metal ions pollutions of water resources with industrialization has generated great concern in the last decade. Metal ions are not only toxic to human beings but also to animals and plants at very low concentrations.

SUMMARY

Therefore, it is an object of the present invention to provide nanofiber materials overcoming drawbacks of the prior art. In particular, nanofiber materials shall be provided having increased water stability and improved metal ion adsorption capacity.

This object has been solved by an amine grafted chitosan nanofiber having the formula (I)

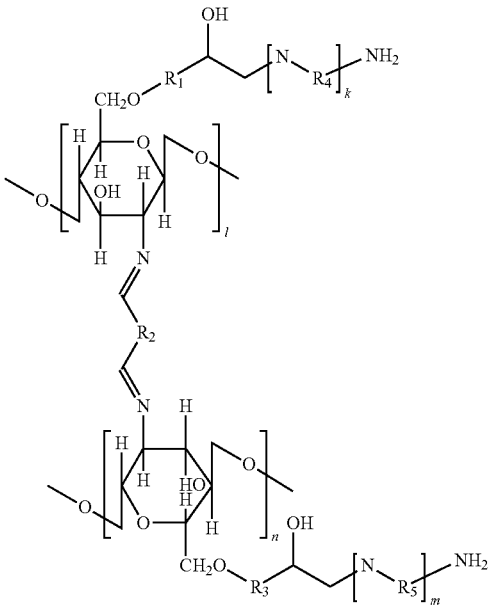

Formula (I)

wherein $R_1$ to $R_5$ are independently selected from linear or branched $C_1$-$C_{20}$ alkandiyl or $C_6$-$C_{24}$ arenediyl; k and m are independently selected from 1 to 10, wherein, in case that k and/or m are >1, each $R_4$ and $R_5$ group can be independently selected; and l and n are independently selected from 50-3000, preferably 100-2500, most preferred from 200-2000.

Chitin substantially only contains of (1-4)-2-acetamido-2-deoxy-d-glucan-units. Chitosan is the deacetylated derivative of chitin, as represented by the top left repeating unit of scheme 1. However, it is general understanding of those skilled in the art that chitosan may still contain traces of 2-acetamido group units. Therefore, the amine grafted chitosan nanofiber according to formula (I) shall be understood as also including such amine graft chitosan nanofibers further containing (1-4)-2-acetamido-2-deoxy-d-glucan units included in the sugar polymer backbone, marked by the square brackets labeled with 1 and n. This denotation is in accordance with the literature where in many cases the formula of chitosan is represented without 2-acetamido groups. It is particularly preferred that the 2-amino-units are dominant in chitosan, meaning an acetamido content of less than 10%, preferably less than 5%.

"Alkandiyl" represents a straight-chain or branched-chain alkandiyl group bound by two different carbon atoms to the molecule. In the same way, arenediyl represents an aromatic group bound by two different carbon atoms to the molecule.

Aromatic groups may be phenylene, condensed aromatics such as naphthalene, anthracene etc., or non-condensed aromatic, such as biphenyl etc.

$R_1$ to $R_5$ groups may optionally be substituted. In particular, arenediyl groups may be optionally substituted by linear or branched alkyl groups. In general, any substituent may be comprised in the groups $R_1$ to $R_5$ as long as it is provided that adsorption properties of the final material or reactions for preparing that material are not overly impaired.

Preferably, $R_2$ is linear or branched $C_2$-$C_5$ alkandiyl, preferably linear $C_3$ alkandiyl.

Also preferred, $R_1$ and $R_3$ are independently selected from linear or branched $C_1$-$C_4$ alkandiyl, preferably are methylene.

Preferably, $R_4$ and $R_5$ are independently selected from ethylene, 2-methyl pentylene, hexylene, phenylene or propylene, wherein, in case that k and/or m are >1, each $R_4$ and $R_5$ group can be independently selected.

Even preferred, k and m are independently selected from 1-4.

The object is also achieved by a method for preparing an amine grafted chitosan nanofiber, comprising: a) providing a solution of a chitosan nanofiber; b) grafting the chitosan nanofiber by aa) reacting the chitosan nanofiber with a compound 1 having at least two functional groups each being able to react with an amine group under formation of a covalent bond; bb) reacting the compound obtained in step aa) with a compound 2 having a leaving group and having a, preferred terminal, epoxide group under formation of a covalent bond and by maintaining the epoxide group; and cc) reacting the compound in step bb) with a compound 3 having at least one group being able to react with an epoxide group under formation of a covalent bond and at least two primary and/or secondary amine groups.

Preferably, the nanofiber provided in step a) is a chitosan nanofiber provided in form of electrospun membranes. Such nanofiber materials are well known from the prior art, in particular from S. Haider et al., Adva. Sci. Let., 2012, 17, 217-233.

Order of steps aa) and bb) in the grafting step b) of the inventive method is not necessarily as stated with step aa) being before step bb). In contrast to that, it is obvious to a person skilled in the art that step cc) can only be conducted after having carried out step bb) before. Thus, also grafting by a reaction sequence in order bb), cc), and aa) is appropriate to be applied in the inventive method.

The exact reaction conditions in steps aa) to cc) strongly depend on the nature of the compounds 1 to 3 chosen in the respective steps. Those skilled in the art will easily be able to chose appropriate compounds 1 to 3 and, if necessary, suitable further reagents to obtain the desired nanofiber material.

It is preferred that all steps aa), bb) and cc) are carried out in the presence of an appropriate solvent. In particular in steps aa) and bb) the solvent of choice can be the same as used in step a) for dissolving the chitosan nanofiber. Particularly preferred, the solvent of choice in steps aa)-cc) is water.

Preferred, compound 1 is a dialdehyde, more preferably is glutaraldehyde.

Further preferred, the leaving group is selected from halide, preferably from Cl, Br or I, sulfonate ester, preferably tosylate, triflate, or mesylate.

Particularly preferred, compound 2 is epichlorhydrin.

Preferably, the group able to react with an epoxide group is a hydroxyl group, thiol group, or amine group, more preferably is an amine group.

Even preferred, compound 3 is ethylene diamine, 2-methyl-1,5-pentane diamine, 1,6-hexamethylene diamine, phenylene diamine, N-(3-aminopropyl)-1,3-propane diamine, spermidine, triethylene tetraamine, spermine, tetraethylene pentaamine, or mixtures thereof.

A person skilled in the art will be clearly aware that, strongly depending on the nature of the compounds used as compounds 1 to 3, further catalyzing or, in more general, supporting reagents might be present in the reaction mixture of respective steps aa)-cc). Since a variety of reactions of amine bonds with appropriate groups under formation of covalent bonds, to react appropriate groups with epoxide groups or to form covalent bonds with hydroxyl groups are known in the art, the skilled artesian will be able to chose appropriate reaction conditions and reaction mixtures for steps aa) to cc) without any burden.

For example, in the preferred case that compound 2 is epichlorhydrin, it is general knowledge that reacting will be carried out in the presence of a base, for example, sodium hydroxide. The same is true as to step cc), provided that the group able to react with the epoxide group is an amine. Likewise, in case that a dialdehyde is used in step aa), it is general knowledge of a person skilled in art that bases, such as potassium carbonate, might be present in the reaction mixture to support the reaction.

All reacting steps aa) to cc) might preferably be carried out at room temperature or at elevated temperatures up to reflux temperature of the solvent chosen in the respective reaction step. The reacting steps can further preferably be carried out under protection gas atmosphere, such as nitrogen-, argon-atmosphere etc. Subsequent to the respective reacting steps cleaning steps, for example to remove excess of reagents, can be preferred. Such cleaning steps may comprise extracting, filtrating, distilling, chromatographing, and the like. Again, respective cleaning steps are general knowledge of those skilled in the art. Reaction times in the reacting steps may, depending on the exact composition of the reaction mixture, between several minutes to several days. Preferably, reaction time will be within the range of several hours. More preferably, reaction time in steps aa) to cc) will be within the range of 1 h to 48 h.

Finally, the object is achieved by use of the inventive nanofiber or a nanofiber obtainable by the inventive method, for adsorption of heavy metal ions.

Preferably, the heavy metal ions are Hg (II), Pb (II), Cu (II), Cr (VI) ions, or mixtures thereof, preferably are Cu (II) ions.

Particularly preferred, the inventive use is removing heavy metal ions from waste water by adsorption. After adsorption, the used material might advantageously be recycled by, for example, substituting the adsorbed heavy metal ions by hydrogen ions under acidic conditions, by subsequent exposure to distilled water (by restoring a thermodynamic equilibrium respectively), etc.

Surprisingly, it was found by the inventors that the inventive nanofibers solve the problem by being more stable in aqueous solution and having increased heavy metal adsorption capacity.

BRIEF DESCRIPTION OF THE DRAWINGS

Additionally features and advantages of the present invention will become apparent from the following detailed description on the basis of examples with reference to the drawings, wherein.

DETAILED DESCRIPTION

Examples

Material and Methods

Material

Figure 1:
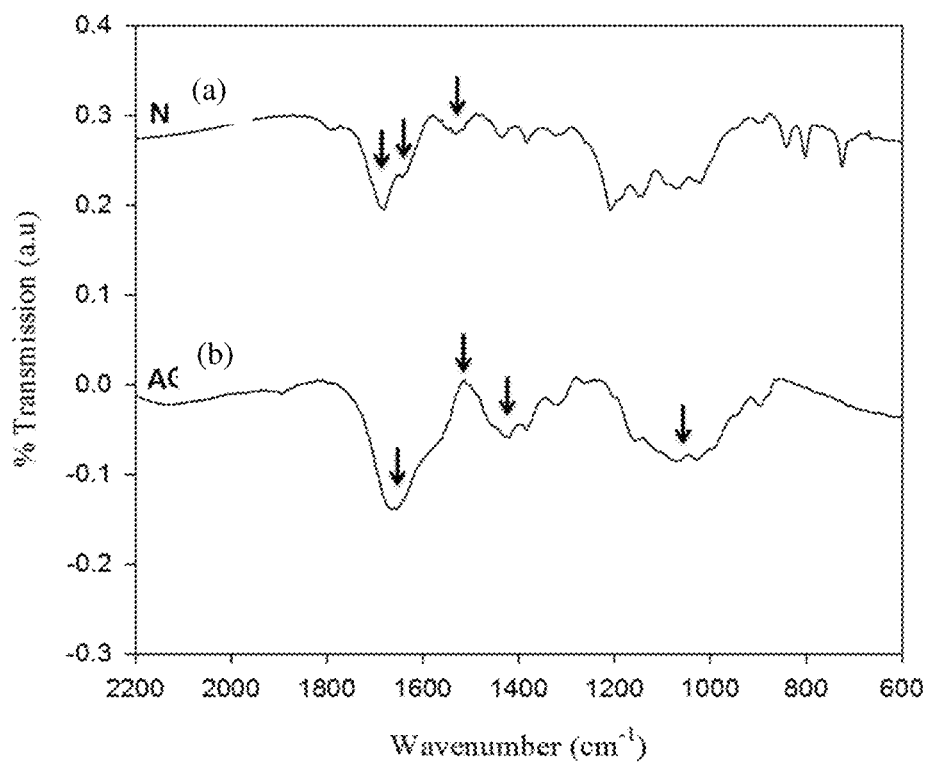
FIG. 1 shows Fourier transform infra red spectra of (a) chitosan nanofibers and (b) amine grafted chitosan nanofibers membranes.

Medium molecular weight chitosan powder, Trifluoroacetic acid ($CF_3COOH$), diethylenetriamine ($C_4H_{13}N_3$), sodium hydroxide (NaOH) were purchased from Sigma-Aldrich. Epichlorohydrin ($C_3H_5ClO$), ethanol ($C_2H_5OH$) absolute and acetone ($C_3H_6O$) were purchased from Alfa Aesar, Paneac Quimica SAU and Scharlab S. L., respectively. Anhydrous potassium carbonate ($K_2CO_3$) and glutaraldehyde ($C_5H_8O_2$) were purchased from Loba Chemie. All the chemicals were of analytical grade and were used without further purification. Distilled water was used for the preparation of $K_2CO_3$ solution. Teflon frame were prepared locally and were used to fix the edges of the nanofibers membrane to avoid shrinkage of the membrane during functionalization.

Preparation of Chitosan Nanofibers Membrane

To prepare the nanofibers membrane, 6 wt % chitosan solution was prepared by dissolving 0.6 g of chitosan powder into 10 mL trifluoroacetic acid. The solution was placed in sonicator bath (Model 2510) at 55° C. for 90 min to ensure complete dissolution of the chitosan. After dissolution, the solution was stirred (Model Cerastir 30539) for 15 min and filtered through mesh with 0.063 mm pore size to obtain homogeneous solution and remove any un-dissolved particles. The prepared chitosan solution was then added to a 5 ml plastic syringe and was electrospun at optimized conditions (Table 1) using electro-spinning machine (Model NANON-01A). The speed of the cylindrical collector was 100 rpm. The nanofibers membrane was removed from the aluminum foil, dried in the vacuum oven (Model ON-12) at 60° C. and −0.1 MPa and stored in the desiccator for functionalization.

TABLE 1

Optimal electrospinning parameters for the present system (Haider et al., Adva. Sci. Let., 2012, 17, 217-223).

| Parameter | Optimization value |
|---|---|
| Concentration Chitosan solution | 6 wt % |
| Flow rate | 0.4 ml/h |
| Voltage applied | 22 kV |
| Needle diameter | 0.8 mm |
| Distance between needle and collector | 100 mm |
| Nanofiber diameter | 103 nm |

Grafting-Reaction

Example 1

Synthesis of Glutaraldehyde Stabilized Chitosan Nanofibers and Glutaraldehyde-Neutralization Stabilized Chitosan Nanofibers Membranes The functionalization reaction of chitosan nanofibers membrane was carried in two routes. First nanofibers membrane was placed on a porous ceramic shelf and 25% glutaraldehyde aqueous solution in a dish at the bottom of the sealed desiccators at room temperature for 48 h. In the second step some of the membranes were rapidly transferred to vessel containing $1M^{-1}$ $K_2CO_3$ aqueous solution. The samples were allowed to remain in the vessel for 3 h at 25° C. The membranes were named as glutaraldehyde stabilized chitosan nanofibers (before $K_2CO_3$ treatment) and glutaraldehyde-neutralization stabilized chitosan nanofibers (after $K_2CO_3$ treatment), respectively.

After reaction, the membranes were washed (to remove the excess glutaraldehyde) and dried in a vacuum oven at 60° C. and −0.1 MPa for 24 h and stored for characterization.

Example 2

Synthesis of Epichlorhydrin Grafted Nanofibers Membrane

To synthesize epichlorhydrin grafted nanofibers membrane, glutaraldehyde-neutralization stabilized chitosan nanofibers membranes were immersed into 50 mL of 0.01 $mol \cdot L^{-1}$ of epichlorhydrin solution containing 0.067 M (pH 10) of NaOH and agitated for 2 h at 40° C. After completion of the reaction (Scheme 1), the samples were washed repeatedly with distilled water (to remove the excess epichlorhydrin) and stored.

Example 3

Synthesis of Amine Grafted Chitosan Nanofibers Membrane

To synthesize amine grafted chitosan nanofibers membrane, epichlorhydrin grafted nanofibers samples were immersed in 50 mL of diethylenetriamine solution and agitated for 4 h at 60° C. The solution of diethylenetriamine was prepared in 4 $M \cdot L^{-1}$ NaOH in 1:10 (e.g., 15 ml of diethylenetriamine with 150 ml of NaOH solution) ratio. After the completion of reaction (Scheme 1), the samples were washed with repeatedly with ethanol and distilled water and stored.

Scheme 1. Novel step wise synthetic route for the synthesis of amine grafted chitosan nanofibers membrane.

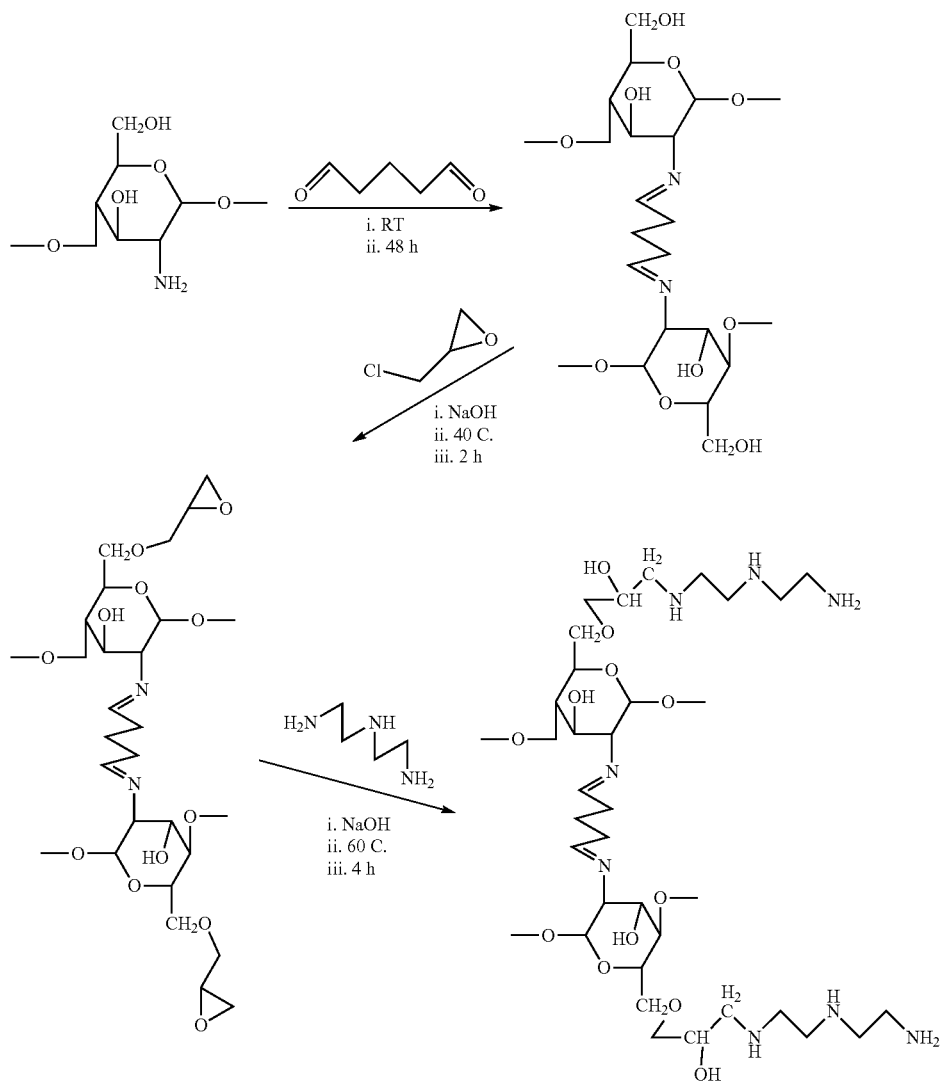

Example 4

Characterization of the Functionalized Nanofibers Membrane a) Morphology Study of the Functionalized Nanofibers The morphologies of the amine grafted chitosan nanofibers and chitosan nanofibers membranes were studied by using a field emission scanning electron microscope (JSM-7600F). To study the surface morphologies of the membranes via field emission scanning electron microscope, nanofibers samples were fixed onto a holder with aid of a carbon tape and then placed in the sputtering machine for platinum coating (to their increase electrical conductivity). After platinum coating the samples were examined by field emission scanning electron microscope under high vacuum.

b) Fourier Transform Infra Red Study

IR spectra of the chitosan nanofibers and amine grafted chitosan nanofibers membrane were studied by using Fourier transform infra red spectrometer (Bruker Vertex 70). For the Fourier transform infra red characterization, the KBr discs of the samples were prepared by mixing and grounding the samples with KBr powder in mortar with a pestle. The mixture was then shaped into discs under mechanical pressure. The samples discs were put into Fourier transform infra red spectrometer and spectral measurements were recorded in the wavenumber range of 600-2200 $cm^{-1}$. The data was processed by using Software OPUS 6.0 (Bruker), which was baseline corrected by rubber band method with $CO_2$ and $H_2O$ bands excluded. To further confirm the introduction of the functional group, carbon, hydrogen and nitrogen data was also collected using carbon, hydrogen and nitrogen analyzer.

c) Stability Study

The degree of stabilities of the chitosan nanofibers and amine grafted chitosan nanofibers membranes were studied in distilled water. To measure the degree of stabilities of the mentioned samples, the samples were first completely dried in oven at 100° C. for 24 h followed by drying in vacuum oven at 60° C. and at −0.1 MPa. The dried membrane samples were weighed and their initial weights were recorded manually in a note book. After weighing the samples were immersed in the vial containing distilled water and allowed to remain in the distilled water for different duration of time (1, 2, 4, 6, 8, 12, 20 and 24 h) at room temperature. The samples were taken out from the vial at the mentioned time durations, dried (following the same method discussed above) and weighed again. The degree of stability (s) was expressed by the following equation:

$$S(\%) = \frac{W1 - W2}{W1} \times 100 \quad (1)$$

where W1 is the initial and W2 the final weight of the dried membranes d) Adsorption Study Dried samples of the amine grafted chitosan nanofibers mats (0.05 g) were added separately to 10 mL synthetic metal-ions solution (400 ppm) and shaken (in a shaker bath (SI-600R)) by a batch technique as a function of time until 24 h at 25° C. Equilibrium time was determined at 8 h from the saturation point of the adsorption. Adsorption equilibrium isotherm was also studied as a function of the metal-ion concentration at 25° C. The concentration of the metal ions in solution (after adsorption experiment) was determined with an inductively coupled plasma mass spectrometry (inductively coupled plasma mass spectrometer (PerkinElmer) and the amount adsorbed was calculated as follows:

$$q = \frac{(C_0 - C_f)V}{M} \quad (2)$$

where q is the amount adsorbed (mg·g$^{-1}$), $C_0$ and $C_f$ are the initial and final metal ion concentrations (mg·L$^{-1}$), respectively, V is the solution volume (L) and M is the amount of adsorbent (g) used.

Results and Discussion

Fourier Transform Infra Red and Carbon, Hydrogen and Nitrogen Studies

The grafting reaction of amine group proceeded via ring opening of the terminal epoxy. Amine grafted chitosan nanofibers membrane showed considerable decrease in the peak between 1000-1200 cm$^{-1}$. This decreased intensity might be attributed to the ring opening (Scheme 1) of the cyclic epoxy. The increased intensity is observed for small ring size between 1000-1200 cm$^{-1}$. The peak at 1630 cm$^{-1}$ for primary amine became broader and slightly reduced. The broadness and only slight reduction in the intensity might be due to two effecting factors; first, the absorption of primary amine due to N—H deformation is medium to strong in this region and second, the overlapping of carbonyl (C=O) and imine (C=N) stretching primary amine (—NH$_2$) bands. Secondary amine (CH—NH—CH) on the other hand showed a weak peak (due to N—H deformation) in the region of 1400-1500 cm$^{-1}$. The above discussion is further supported by the carbon, hydrogen and nitrogen data (Table 2) where significant increase in the carbon, hydrogen and nitrogen for the amine grafted chitosan nanofibers was observed. The complementation of Fourier transform infra red (FIG. 1) and carbon, hydrogen and nitrogen data (Table 2) prove that desired product is formed.

TABLE 2

Carbon, hydrogen and nitrogen data of the nanofibers and amine grafted chitosan nanofibers membranes.

| | % Found | | | |
|---|---|---|---|---|
| Total | N | H | C | Compound |
| 44.4 | 5.37 | 5.19 | 33.84 | Chitosan nanofibers |
| 57.85 | 7.30 | 7.32 | 43.23 | Amine grafted chitosan nanofibers |

Morphology Study

Figure 2:
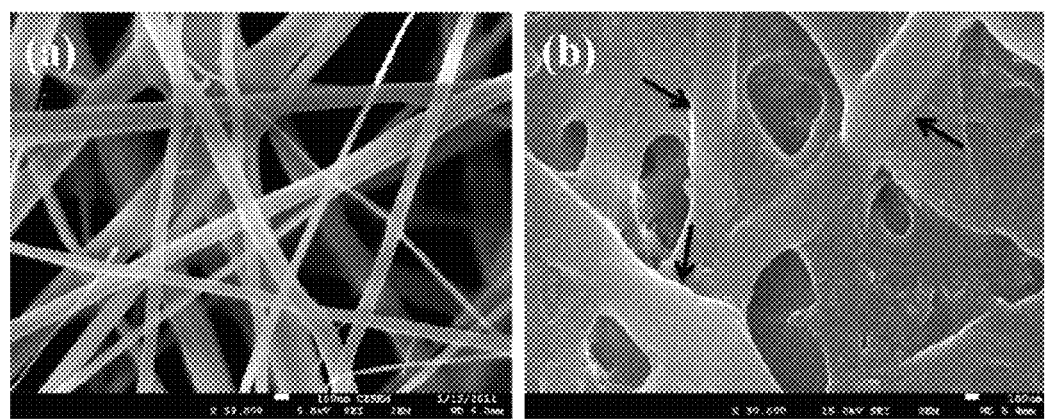
FIG. 2 shows field emission scanning electron microscope micrographs of the surface of the chitosan nanofibers (a) and amine grafted chitosan nanofibers (b) membranes.

FIG. 2 shows the field emission scanning electron microscope micrographs for chitosan nanofibers and amine grafted chitosan nanofibers membranes. Almost similar morphologies for amine grafted chitosan nanofibers and chitosan nanofibers membranes were observed without any serious cracks or degradation. However, in case of amine grafted chitosan nanofibers the average fiber diameters is increased, which is most likely due to the glutaraldehyde, epichlorhydrin and diethylenetriamine bonding.

Stability Study

Figure 3:
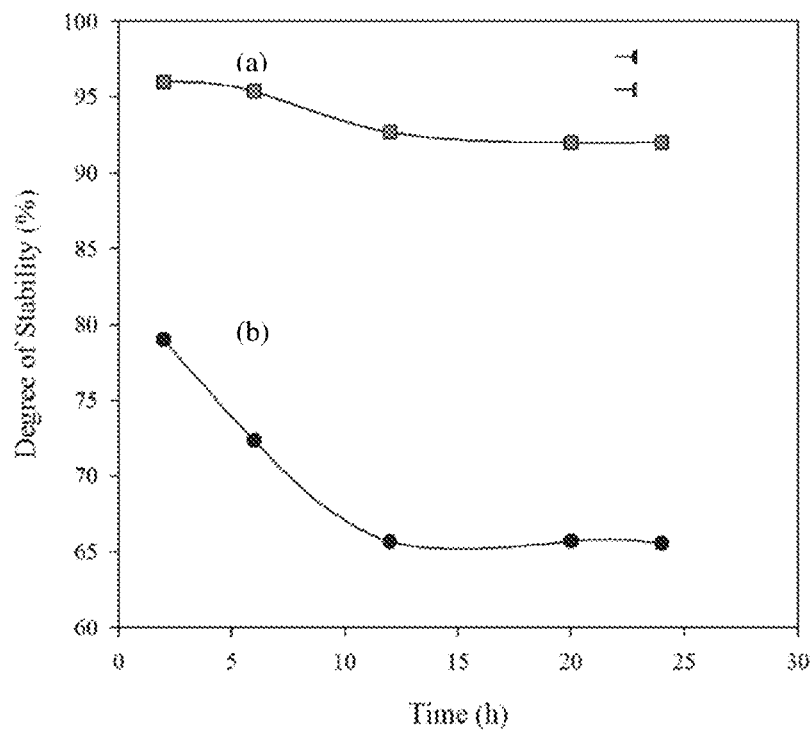
FIG. 3 shows stability of (a) glutaraldehyde stabilized chitosan nanofibers and (b) amine grafted chitosan nanofibers membranes.

FIG. 3 shows the degree of stability (calculated according to Eq. (1)) of the glutaraldehyde stabilized chitosan nanofibers and amine grafted chitosan nanofibers membranes in distilled water. Chitosan nanofibers could not be compared with amine grafted chitosan nanofibers as it got dissolved as soon it was immersed in the vial. The reason for this dissolution was the salt formation between the ammonium (—NH$_3^+$) and carboxyl (—COO$^-$) ions. Amine grafted chitosan nanofibers membrane showed good stability as compared to glutaraldehyde stabilized chitosan nanofibers membrane. The order of stability for amine grafted chitosan nanofibers and glutaraldehyde stabilized chitosan nanofibers in distilled water until 24 h was (94% weight remained i.e., 6% loss) >glutaraldehyde stabilized chitosan nanofibers (66% weight remained. i.e., 44% loss). This high stability for amine grafted chitosan nanofibers might be due to formation of more imine (C=N).

Adsorption Study

Figure 4:
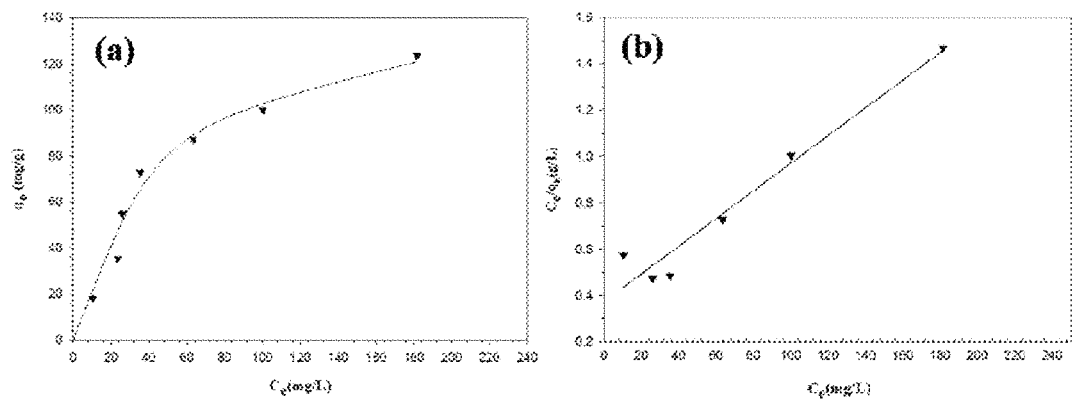
FIG. 4 shows Cu (II) adsorption onto amine grafted chitosan nanofibers membrane; (a) adsorption isotherm and (b) Langmuir plot.

A number of papers have been published on the performance of processed and functionalized chitosan for the removal metal ion. However, very few have shown efficient results. In the present invention the processing and functionalization of chitosan have been combined and their effect on the removal of metal ions from aqueous solution has been studied. The equilibrium adsorption amounts of Cu(II) ions onto amine grafted chitosan nanofibers membrane after 8 h (equilibrium time) as a function of equilibrium concentrations (FIG. 4a) The adsorption of Cu(II) ions increased rapidly with increase in the initial concentration, however; further increase in the initial concentration led to a gradual decrease in the adsorption. The initial increase might be due to the increased surface area (due to nano size) and binding sites (such as amine, primary and secondary hydroxyl groups). The adsorption equilibrium data Cu (II) ions were analyzed with the following Langmuir adsorption (FIG. 4b) equation $$\frac{C_e}{q_e} = \frac{1}{K_L q_m} + \frac{C_e}{q_m} \quad (3)$$

where $q_e$, is the equilibrium quantity of the metals ions adsorbed onto the amine grafted chitosan nanofibers membrane (mg·g$^{-1}$), $C_e$ is the equilibrium concentration (mg·L$^{-1}$), and $q_m$ (mg·g$^{-1}$), and $K_L$ (L·mg$^{-1}$) are the Langmuir constants related to the saturation adsorption capacity and binding energy (affinity), respectively. Table 3 shows the values of $q_m$ and $K_L$, which were calculated from the slope and intercept of the $C_e/q_e$, versus $C_e$ plots. Increased maximum adsorption ($q_m$) capacity was observed for amino grafted chitosan nanofiber (166.67 for Cu (II)). This increased might be related to the increase in the number of amine binding sites (nitrogen which donates lone-pair of electron) for chelation. The adsorption capacity of the present systems was much higher, particularly for Cu(II) when compared to conventionally processed chitosan and other adsorbents (Table 4).

TABLE 3

Langmuir constants for the adsorption of Cu (II) onto amine grafted chitosan nanofibers.

| Functionality | $q_m$ (mg · g$^{-1}$) | $K_L$ (L · mg$^{-1}$) | $r^2$ |
|---|---|---|---|
| Amine grafted chitosan nanofibers | 166.67 | 2.67 | 0.9770 |

TABLE 4

Comparison of the maximum adsorption capacities ($q_m$) of various adsorbents from literature and the present work(*).

| Adsorbent | Cu(II) $q_m$ (mg · g$^{-1}$) |
|---|---|
| Anaerobically digested sludge (M. S. Gould, E. J. Genetell, Water Res., 12 (505) (1978), p. 512)) | 49.00 |
| Calcium-alginate (C. Huang, Y. C. Chung, M. R. Liou, J. Hazard, Mater., 45 (1996), 265-277) | 15.80 |
| Activated sludge (V. K. Gupta, Ind. Eng. Chem. Res., 37 (1998), 192-202) | 35.30 |
| Chitosan (Plain) (C. Huang, Y. C. Chung, M. R. Liou, J. Hazard, Mater., 45 (1996), 265-277) and chitosan flakes (R. Bassi, S. O. Prasher, B. K. Simpson, Sep. Sci. Technol., 35 (2000), 547-560) | 45.20-2.83 & 20.92 |
| Chitosan microsphere (W. S. Wan Ngah, C. S. Endud, R. Mayanar, React. Funt. Polym., 50 (2002), 181-190) | 80.70, 39.10 |
| Chitosan modified with reactive blue (L. V. Helder, T. F. Valfredo, S. G. Norberto, C. M. L. Mauro, React. Funct. Polym., 67 (2007), 1052-1060) | 57.00 |
| Chitosan crosslinked with ether diglycidyl-ethylene glycol (W. S. Wan Ngah, C. S. Endud, R. Mayanar, React. Funt. Polym., 50 (2002), 181-190) | 49.90 |
| Chitosan crosslinked with glutaraldehyde (W. S. Wan Ngah, C. S. Endud, R. Mayanar, React. Funt. Polym., 50 (2002), 181-190) | 59.70 |
| Chitosan crosslinked with epichlorhydrin (W. S. Wan Ngah, C. S. Endud, R. Mayanar, React. Funt. Polym., 50 (2002), 181-190) | 62.50 |
| Chitosan modified with 2 [-bis-(pyridylmethyl) aminomethyl]-4 methyl-6-formyl-phenol (K. C. Justus, M. C. M Laranjeiraa, A. Nevesa, A.S. Mangrich, V. T. Faverea Polymer, 45 (2004), 6285-6290) | 109.00 |
| *Amine grafted chitosan nanofibers (Amine grafted chitosan nanofibers) | *166.67 |

*Note. Present work

CONCLUSION

The novel step wise synthetic route was use to prepare amine grafted chitosan nanofibers. Fourier transform infra red and carbon, hydrogen, and nitrogen data confirmed the introduction of new functional groups into the primary structure of chitosan and no deterioration of the nanofibers morphology after grafting was observed from field emission scanning electron microscope micrograph. The amine grafted chitosan nanofibers membranes showed good aqueous stabilities (with only ~6% loss in weight until 24 h) which was less than the weight loss by glutaraldehyde stabilized chitosan nanofibers (~44% loss in weight until 24 h) and chitosan nanofibers (100% loss in weight as soon after it was immersed in distilled water). The maximum adsorption ($q_m$) capacity of amine grafted chitosan nanofibers for Cu (II) was observed to be 166.67 mg·g$^{-1}$. The adsorption capacity of the present systems was much higher for Cu (II) when compared to the already existing conventional and chitosan adsorbents. The combination of processing and amine grafting significantly increased the adsorption capacity of nanofibers membranes.

The features disclosed in the foregoing description, the claims and/or in the accompanying drawings may, both separately and in any combination thereof, by material for realising the invention in diverse forms.

The invention claimed is:

1. Method for preparing an amine grafted chitosan nanofiber, comprising:
    a) providing a solution of a chitosan nanofiber;
    b) grafting the chitosan nanofiber by
        aa) reacting the chitosan nanofiber with a compound 1 being a dialdehyde in the presence of $K_2CO_3$;
        bb) reacting the material obtained in step aa) with a compound 2 having a leaving group and having a, preferred terminal, epoxide group under formation of a covalent bond and by maintaining the epoxide group; and
        cc) reacting the material obtained in step bb) with a compound 3 having at least one group being able to react with an epoxide group under formation of a covalent bond and at least two primary and/or secondary amine groups.

2. Method according to claim 1, wherein the leaving group is selected from halide, and sulfonate ester.

3. Method according to claim 1, wherein compound 2 is epichlorohydrin.

4. Method according to claim 1, wherein the group able to react with an epoxide group is a hydroxyl group, thiol group, or amine group.

5. Method according to claim 1, wherein compound 3 is ethylene diamine, 2-methyl-1,5-pentane diamine, 1,6-hexamethylene diamine, phenylene diamine, N-(3-aminopropyl)-1,3-propane diamine, spermidine, triethylene tetraamine, spermine, tetraethylene pentaamine, or mixtures thereof.

6. Method according to claim 4, wherein the group able to react with an epoxide group is an amine group.

* * * * *